United States Patent
Brakefield

(10) Patent No.: US 6,542,597 B1
(45) Date of Patent: Apr. 1, 2003

(54) SYSTEM AND METHOD FOR SELECTIVE CALL FORWARDING DEACTIVATION

(75) Inventor: William A. Brakefield, Austin, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/342,792

(22) Filed: Jun. 29, 1999

(51) Int. Cl.[7] .............................................. H04M 3/42
(52) U.S. Cl. ............................. 379/211.01; 379/211.02
(58) Field of Search ....................... 379/211.01, 211.02, 379/212.01

(56) References Cited

U.S. PATENT DOCUMENTS

| | | | |
|---|---|---|---|
| 5,465,295 A | 11/1995 | Furman | 379/211 |
| 5,509,062 A | 4/1996 | Carlsen | 379/210 |
| 5,509,063 A | 4/1996 | Crabtree et al. | 379/221 |
| 5,729,599 A | 3/1998 | Plomondon et al. | 379/211 |
| 5,839,065 A | 11/1998 | Joensuu et al. | 455/414 |
| 6,151,500 A | * 11/2000 | Cardina et al. | 455/435 |
| 6,411,802 B1 | * 6/2002 | Cardina et al. | 379/2 X |

* cited by examiner

Primary Examiner—Creighton Smith

(57) ABSTRACT

A call forwarding system is provided wherein a subscriber may forward calls from a first telephone to a desired destination, for example, a mobile telephone. A "Call Unforward Once" function is provided wherein a subscriber or other user may bypass the call forwarding for an individual call, but maintain the call forwarding function for other calls. In operation, the subscriber may place a call from the forwarded-to number to the forwarded-from number and dial a predetermined function code. The function code allows the user to connect to the forwarded-from number.

15 Claims, 4 Drawing Sheets

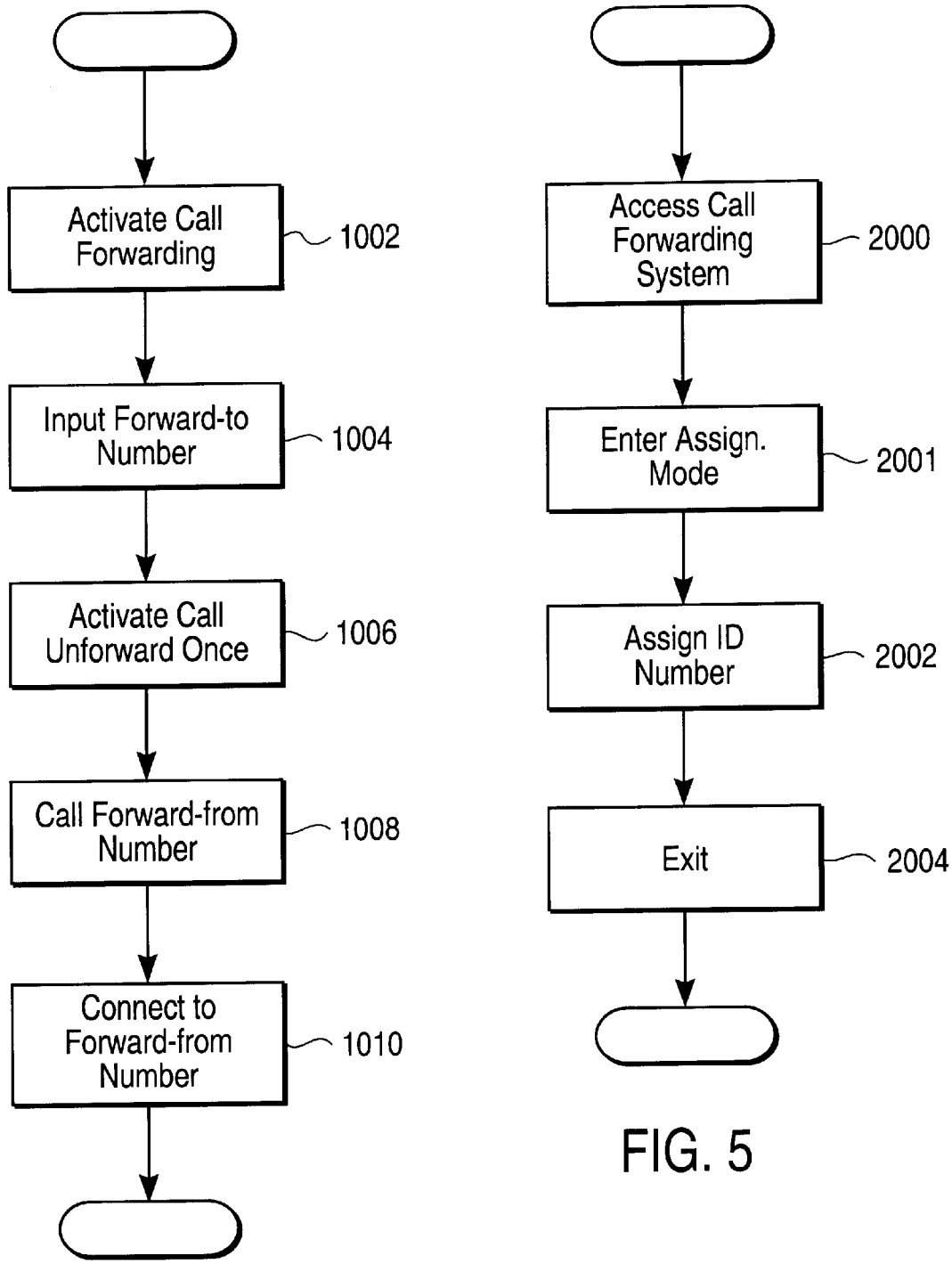

SYSTEM AND METHOD FOR SELECTIVE CALL FORWARDING DEACTIVATION

BACKGROUND OF THE INVENTION

1. Field of the Invention

The present invention relates to telephony features and, particularly, to an improved call forwarding feature.

2. Description of the Related Art

Call forwarding is one of several features presently available to telephone subscribers. Call forwarding allows a telephone subscriber to forward calls incoming to his or her telephone number to another telephone number. In operation, the subscriber enters a service code followed by a destination telephone number to which incoming calls are forwarded.

It is frequently desirable to have some calls forwarded and some calls not forwarded. In many call forwarding systems, there is no ability to select callers who are and are not to be forwarded. In this case, all calls are forwarded.

Other call forwarding systems permit subscribers to specify the numbers of callers who are and are not to be forwarded. The call forwarding system then compares the calling number, for example, using Caller ID with the stored database. Authorized callers are forwarded and the others are not. However, this requires the subscriber to foresee who will and will not be calling. Otherwise, all calls are forwarded, and the forwarded from number cannot receive the calls.

A telephony system is known wherein a caller may specify a particular routing for a call based on dialing a predetermined suffix in which the routing is independent of the telephone number. As described in U.S. Pat. No. 5,465,295, this system allows, for example, a caller to place a call to a fax machine associated with a called party by dialing that party's home telephone number and then dialing a particular suffix. In response to the suffix, the network directs the call to the fax machine, rather than to the called party's telephone number. Dialing a different suffix will cause the call to be routed to a different, known location, such as an electronic messaging service. However, if call forwarding from the called party's number is activated, the system of U.S. Pat. No. 5,465,295 still does not allow the caller to prevent the forwarding of his or her call and direct the call to the forwarded-from number.

SUMMARY OF THE INVENTION

These disadvantages in the prior art are overcome in large part by a system and method according to the present invention. In particular, a call forwarding system is provided wherein a subscriber may forward calls from a first telephone to a desired destination, for example, a mobile telephone. A "Call Unforward Once" function is provided wherein a subscriber or other user may bypass the call forwarding for an individual call, but maintain the call forwarding function for other calls. In operation, the subscriber may place a call from the forwarded-to number to the forwarded-from number and dial a predetermined function code. The function code allows the user to connect to the forwarded-from number.

According to another embodiment of the invention, the Call Unforward Once function may be associated with an identification code. According to this embodiment, a caller may input the identification code when calling the forwarded-from number. The telephone system compares the identification code to a database associated with the forwarded-from number. If the code is listed as being associated with the forwarded-from number, the call will be connected to the forwarded-from number, rather than being forwarded to the forwarded-to number.

BRIEF DESCRIPTION OF THE DRAWINGS

A better understanding of the invention is obtained when the following detailed description is considered in conjunction with the following drawings in which:

FIG. 4 is a flowchart illustrating system operation according to an embodiment of the invention;

FIG. 5 is a flowchart illustrating system operation according to an embodiment of the invention.

DETAILED DESCRIPTION OF THE INVENTION

Figure 1:
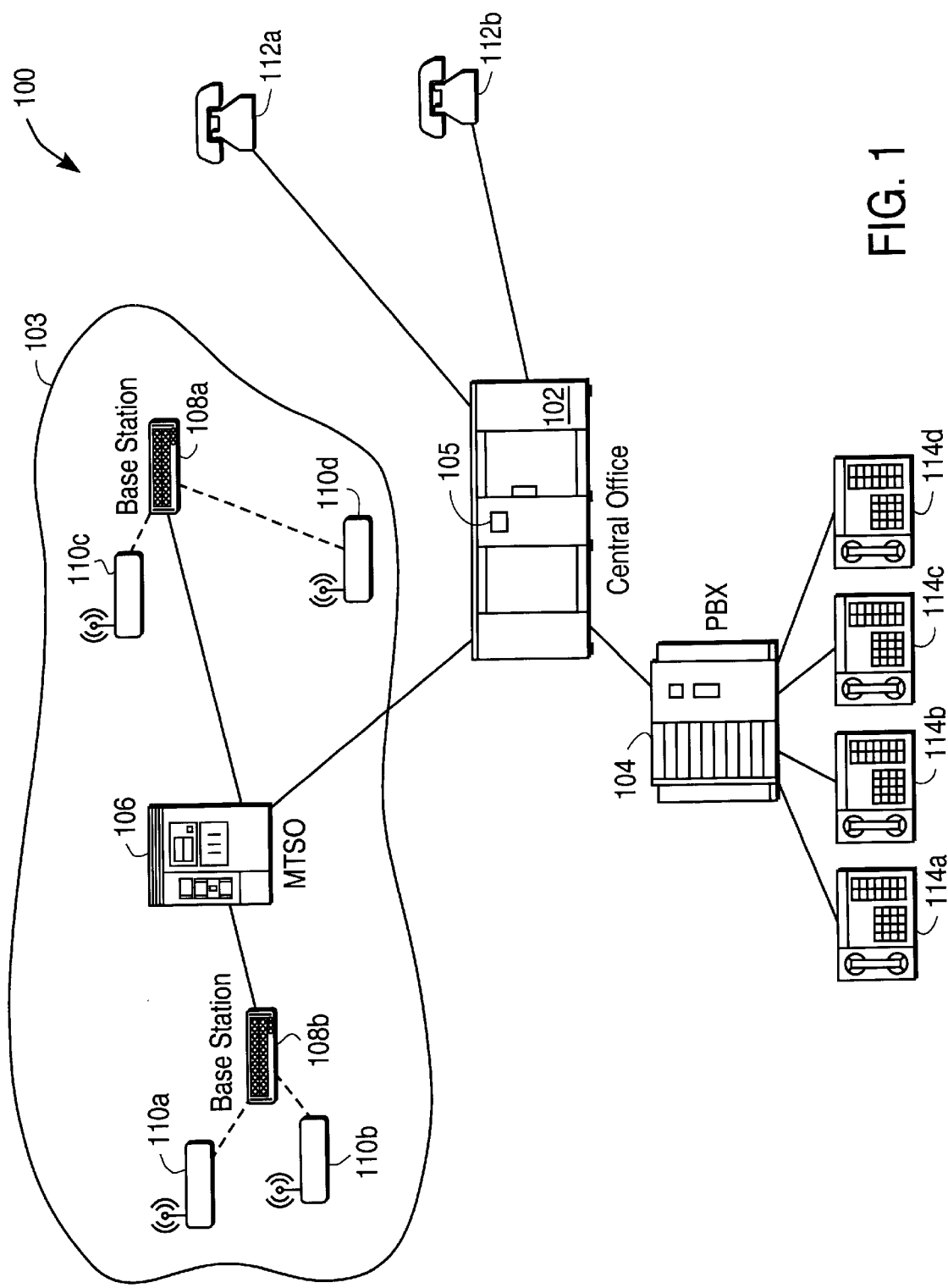
FIG. 1 is a diagram illustrating a telecommunications system according to an embodiment of the invention.

Turning now to the drawings, and with particular attention to FIG. 1, a diagram illustrating an exemplary telecommunications system 100 according to an embodiment of the present invention is shown. The present invention permits a Call Unforward Once functionality, wherein a particular call is allowed to bypass a call forwarding system, i.e., not be forwarded, while other calls are forwarded.

As shown in FIG. 1, the telecommunications system 100 includes a Central Office (CO) 102 to which are coupled a plurality of telephony devices 112a, 112b, such as telephones. Also coupled to the CO 102 may be a Private Branch Exchange (PBX) 104 to which are coupled one or more telephony devices 114a–114c. The CO 102 further includes a Call Unforward Once module 105, according to the present invention, as will be discussed in greater detail below. It is noted that in other embodiments, the Call Unforward Once module 105 may be embodied in the PBX 104 or any switching device which will support a call forward function. Thus, FIG. 1 is exemplary only. Further, it is noted that, while illustrated as a discreet module, typically, the Call Unforward Once module 105 is embodied in software.

Also coupled to the CO 102 may be a cellular or mobile telephony network 103. The mobile telephony network 103 may include one or more Mobile Telephone Switching Offices (MTSO) 106 which serve one or more base stations 108a, 108b. As is known, the base stations 108a, 108b provide switching for predefined geographical regions, usually referred to as cells. A plurality of mobile telephony devices 110a–110d, such as cellular telephones, may move from one cell to another, in a known manner. Each of the mobile telephony devices 110a–110d is capable of initiating or receiving a telephone call through one or more of the base stations 108a, 108b and the mobile telephone switching office MTSO 106. The MTSO 106 is connected by communications links, for example, cables to each of the base stations 108a, 108b and to the CO 102.

In one embodiment, one or more of the mobile telephony devices 110a–110d may be provided with a Call Unforward Once controller 111 according to the present invention which is used to generate a Call Unforward Once command to be received by the CO 102. The CO 102 recognizes the Call Unforward Once Command and allows the caller to bypass call forwarding, as will be described in greater detail below. In other embodiments, the Call Unforward Once Command may be implemented merely as a predetermined DTMF (dual tone multifrequency) code or sequence; no additional controller is needed.

For example, a particular individual or user may subscribe to both a landline and a mobile telephone service. Thus, the user may have telephone 112a as his home or office telephone and telephone 110a as his mobile telephone. The user may further subscribe to a call forwarding service through his land line telephone 112a, as is known. As such, the user may cause calls directed to the telephone 112a to be forwarded to the telephone 110a. Thus, the CO 102 receives a command from the telephone 112a to direct all calls to the telephone 110a. The user may be provided with a Call Unforward Once service according to the present invention, however, whereby the user may input a number or command code at the telephone 110a and call the telephone 112a and not be forwarded, without having to deactivate the call forwarding service altogether. Further, the user may provide others with a PIN or personal identification number, such that such others may call the telephone 112a while call forwarding to the telephone 110a is active, without being forwarded to the telephone 110a.

Figure 2:
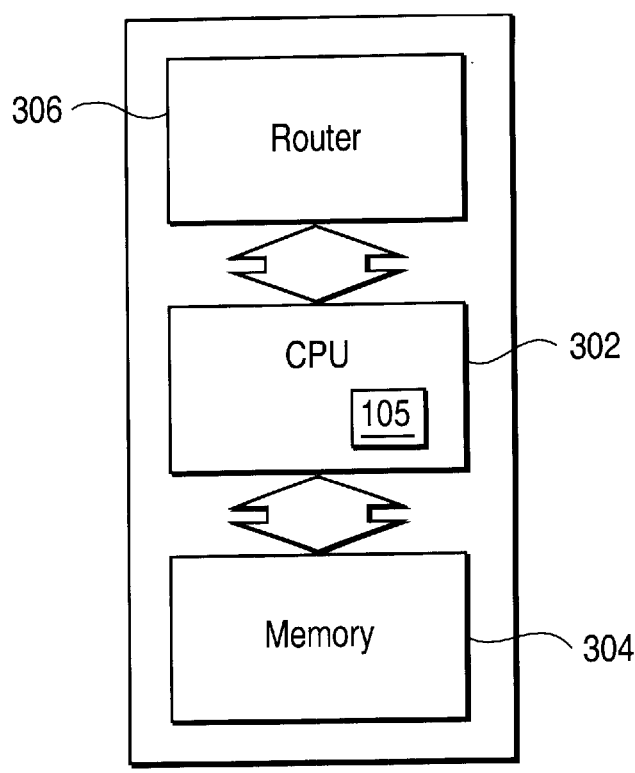
FIG. 2 is a diagram illustrating a mobile terminal according to an embodiment of the invention.

An exemplary CO 102 including a Call Forwarding functionality according to the present invention is illustrated in FIG. 2. As is well known, the CO 102 may include a control processor 302 coupled to a memory unit 304 and associated with a router 306. The CPU 302 performs functions such as supervising the transfer of calls via the router 306 from one telephony device or network to another telephony device or network. The CPU 302 is programmed with a Call Unforward Once module 105 to perform the Call Unforward Once function according to the present invention, as will be described in greater detail below. In addition, the CPU 302 stores in the memory 304 subscriber identification and location and call forwarding codes. User information codes stored in the memory unit 304 may include whether or not a subscriber has call forwarding and whether a call from a particular number is allowed to be forwarded.

Figure 3:
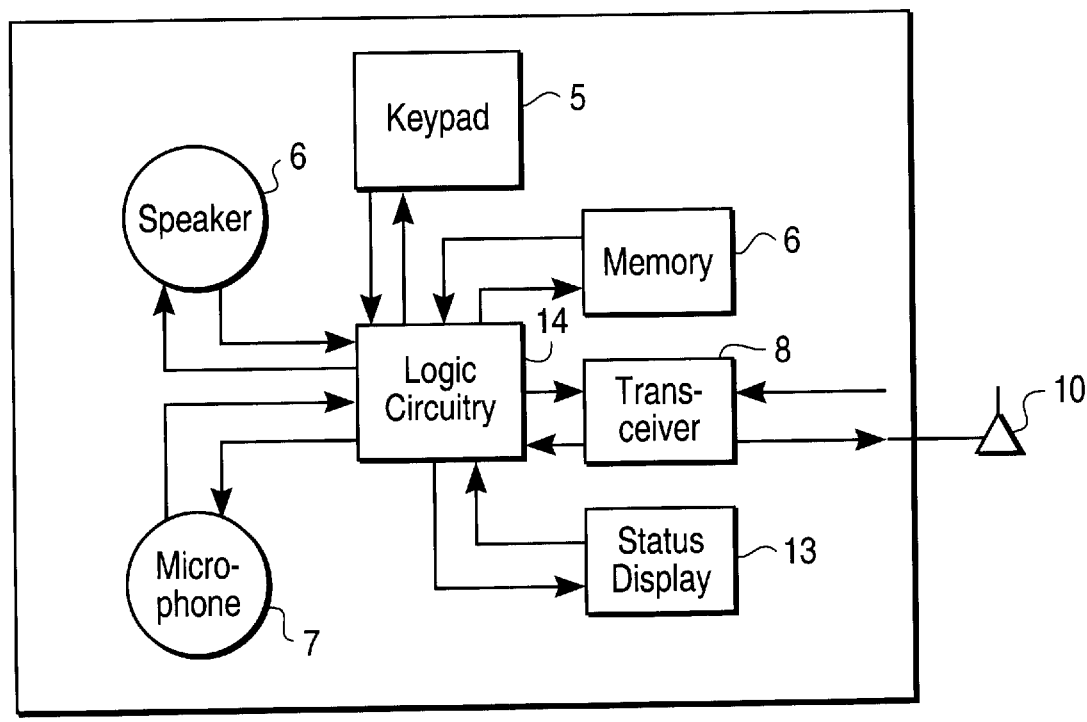
FIG. 3 is a diagram of a telephony switch according to an embodiment of the invention.

Turning to FIG. 3, a diagram of a mobile telephony device, such as mobile telephony device 110a is shown. The mobile telephony device 110a includes a handset having a keypad 5. Also included in the mobile station are a speaker 6 and a microphone 7. A transceiver 8 ordinarily built into the mobile telephony device 110a exchanges signals via, for example, an antenna 10 with the mobile telecommunication switching office (MTSO) 106, typically via radio telephone signals relayed by one of several cell base stations 108a, 108b that are in turn connected with the MTSO land line.

The operation of the mobile telephony device 110a is controlled by logic circuitry 14. The logic circuitry 14 may be implemented in the form of a microprocessor which executes programs that are stored in a storage device, such as a read only memory or by discrete logic components or one or more integrated semiconductor chips. Under the control of the logic circuitry 14, the transceiver 8 transmits cellular control signals to a cell site over a signaling channel. The control signals include requests that the (MTSO) 106 dial a specified telephone number and assign a voice frequency or channel for use by the mobile telephony device 110a. The mobile telephony device 110a includes a read/write memory 16 accessible to the user and whose contents are configurable. Finally, as will be explained in greater detail below, the logic circuitry 14 may be programmed to provided a command to the CO 102 to override or bypass a call forwarding service for a particular call. Alternatively, the logic circuitry 14 may be provided with a DTMF encoder (not shown) which transmits DTMF codes to indicating that the Call Unforward Once function should be activated.

FIG. 4 is a flowchart illustrating system operation according to an embodiment of the invention. In particular, in a step 1002, a user, for example, of telephone 112a activates a call forwarding feature to which the user subscribes. Thus, the user inputs a predetermined DTMF code sequence, such as *50, which is received at the CO 102 by the CPU 302. The CO 102 and particularly, the CPU 302 recognizes the code and then activates the call forwarding feature. The CPU 302 enters a wait mode and awaits the forwarded-to number. Next, in a step 1004, the user inputs the forwarded-to number. For example, the user may provide the number as a sequence of DTMF (dual tone multifrequency) digits, in a known manner. The CPU 302 of the CO 102 receives the forward-to number and stores it in the memory 304. Once the call forwarding feature has been activated and the forward-to number received, all calls will be forwarded by the CPU 302 and the router 306 to the forward-to number, until the user deactivates the call forwarding service.

Next, in a step 1006, the user, now associated with the forward-to telephone 110, wishes to leave a message with an answering machine or voice mail service associated with the telephone 112, or contact someone at the location of the telephone 112, but without having to deactivate the call forwarding service. Thus, the user activates the Call Unforward Once service, for example, by pushing a soft key or by inputting a predetermined sequence of numbers, for example *34. If a soft key is employed, the controller 111 will send a signal to the CO 102. Otherwise, a DTMF controller, for example, associated with the logic circuitry 14, will send the corresponding signal. The signal is provided to one of the base stations 108a, 108b, to the MTSO 106, and then to the CO 102. In response, the CPU 302 accesses the memory 304 to determine what function to perform in response to the received code. Then, in a step 1008, the user dials the forwarded-from number. Again, the dialed number is provided to the CO 102 via the base station and the MTSO 106. In a step 1010, the CO 102 and particularly, the CPU 302 receives the number. The CO 102 and the router 106 then connect the call to the forwarded-from number. Subsequent calls, however, will be forwarded to the forward-to number.

According to another embodiment of the invention, the user may provide an identification number whereby other parties may call the forwarded-from number without being forwarded to the forward-to number. To do so, the user must input an identification code for the CO 102 to recognize. It is noted that a default code may also be provided.

Turning now to FIG. 5, a flowchart illustrating the identification code assignment process is shown. Thus, for example, the user of the telephone 112a may access the call forwarding system at the CO 102, for example, by inputting a predetermined DTMF sequence. The CPU 302 recognizes that the call forwarding system is to be activated. Next, in a step 2001, the user inputs another DTMF sequence, which indicates to the CPU 302 that a setup mode is to be entered. Then, in a step 2002, the user inputs an identification number. The CPU 302 stores the input identification number in a database in the memory 304 such that, when the identification number is received, a call to the user's telephone 112a will not be forwarded, if the call forwarding is active. Then, in a step 2004, the user exits the initialization.

Figure 6:
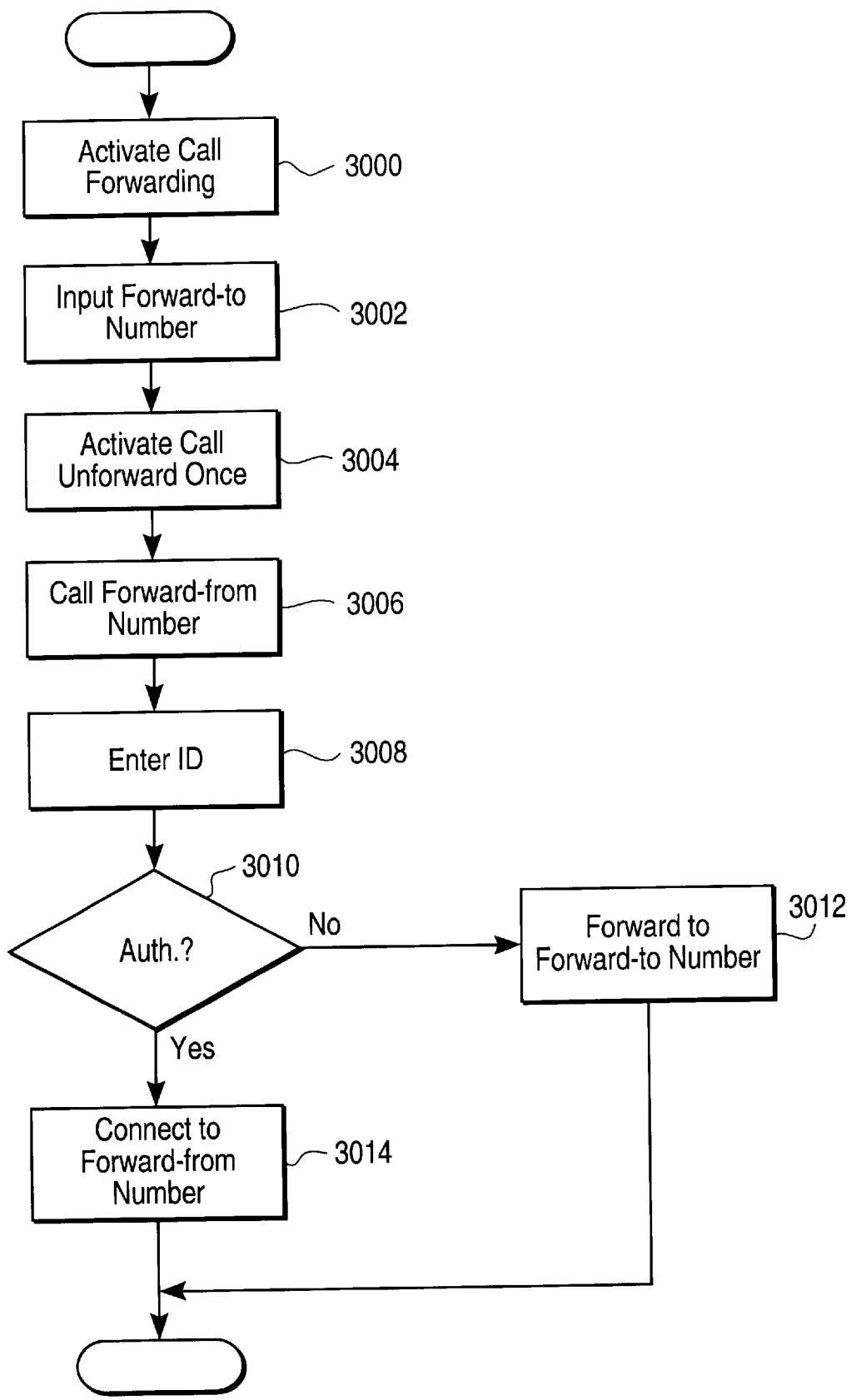
FIG. 6 is a flowchart illustrating system operation according to an embodiment of the invention.

Use of this embodiment of the invention is illustrated with reference to FIG. 6. In particular, in a step 3000, the user activates the call forwarding service. Thus, for example, the user inputs a predetermined code which is received as DTMF signals at the CO 102. The CPU 302 recognizes the received DTMF sequence, then activates the call forwarding functionality and awaits input of the forward-to number. In a step 3002, the user inputs the forward-to number. For example, the user inputs the number using the telephone's keypad. The number is received as a sequence of DTMF digits. The CPU 302 stores the forward-to telephone number in the memory 304. The CPU 302 further associates the forward-to number, the forward-from number, and the identification code that was set in the process of FIG. 5.

In a step 3004, a third party caller, for example, a user of a telephony device 114a, may activate the Call Unforward Once service, for example, by pressing a soft key or by entering a sequence of DTMF digits. The activation code is received at the CO 102. In a step 3006, the third party caller dials the forwarded-from number. Immediately thereafter (or before), the third party enters the identification number that the user set according to the method of FIG. 5. The PBX 104 transfers this information to the CO 102 and, particularly, to the CPU 302. In step 3010, the CPU 302 accesses the memory to check the number to determine if the user is authorized to bypass the call forwarding service. If no match is found, then in a step 3012, the call is forwarded to the forward-to number. However, if a match is found and it is determined that the user is authorized, then in a step 3014, the call is connected to the forwarded-from number.

What is claimed is:

1. A method for operating a call forward system, comprising:

activating a feature forwarding calls from a predetermined telephone number;

setting a destination number to which calls from said predetermined telephone are forwarded;

calling said predetermined telephone number from a second predetermined telephone number;

activating an unforward once feature; and connecting said call from said second predetermined telephone number to said first predetermined telephone number while keeping call forwarding active for subsequent calls to said predetermined telephone number.

2. A method according to claim 1, wherein said second telephone number is the same as said destination number.

3. A method according to claim 1, further comprising determining whether said second predetermined number is permitted to activate said unforward once feature.

4. A method according to claim 3, wherein said determining comprises determining whether a user calling from said second predetermined number is authorized to activate said unforward once feature.

5. A method according to claim 1, further comprising forwarding said call from said second telephone number to a voice messaging system.

6. A call forwarding system, comprising:

a plurality of telephones;

means for forwarding a call from one of said plurality of telephones to another of said plurality of telephones; and means for allowing one or more calls to a forwarded-from one of said plurality of telephones to bypass an active call forwarding feature for individual calls on a call-by-call basis.

7. A call forwarding system according to claim 6, said allowing means including means for receiving an identification code associated with a forwarded form one of said plurality of telephones.

8. A subscriber terminal, comprising:

logic circuitry for controlling operations of said subscriber terminal;

a transceiver coupled to said logic circuitry for transmitting and receiving signals; and a keypad coupled to said logic circuitry for inputting control information; wherein said logic circuitry is configured to cause a signal to be transmitted via said transceiver to cause a switch to bypass a call forwarding service for individual calls on a call-by-call basis.

9. A subscriber terminal according to claim 8, wherein said logic circuitry is configured to place a call to a number for which call forwarding has been bypassed.

10. A subscriber terminal according to claim 9, wherein said logic circuitry causes said signal to be transmitted responsive to an input from said keypad.

11. A subscriber terminal according to claim 10, wherein said signal is one or more DTMF tones.

12. A telephony switch comprising:

a router for routing calls;

a central processing unit for controlling operation of said router and configured to a supervise call forwarding functions; and a memory for storing caller and called party information accessible by said central processing unit for controlling operation of said router; wherein said central processing unit is programmed to receive signals from subscriber units to disable a call forwarding function on a call-by-call basis such that said router routes a call accompanied by said signals to a forwarded-from number instead of forwarding said call to a forwarded-to number.

13. A telephony switch according to claim 12, wherein said central processing unit receive said signals as dual tone multifrequency signals.

14. A telephony switch according to claim 12, wherein said central processing unit is configured to disable said call forwarding for said call if said call is from an authorized number.

15. A telephony switch according to claim 14, wherein said central processing unit is configured to disable said call forwarding if said call is from said forwarded-to number.

* * * * *